Patented Oct. 12, 1943

2,331,858

UNITED STATES PATENT OFFICE 2,331,858

PREPARING SOLUTIONS OF CELLULOSE GLYCOLLIC ACID SALTS

Richard D. Freeman and Martin J. Roberts, Midland, Mich., assignors to The Dow Chemical Company, Midland, Mich., a corporation of Michigan No Drawing. Application March 6, 1941, Serial No. 382,102

8 Claims. (Cl. 260—232)

This invention relates to a method of preparing solutions of polyvalent metal salts of cellulose glycollic acid. It relates in particular to such a method whereby neutral, or slightly acid solutions of such salts may be prepared, and to the solutions thereby obtained.

The polyvalent metal salts of cellulose glycollic acid do not dissolve when suspended in water. Such salts, at best, only swell and become gelatinous and do not form smooth solutions. This is equally true, whether the water is cold or hot. It is known, however, that when bases are added to aqueous suspensions of polyvalent metal salts of cellulose glycollic acid, the salts will dissolve forming clear solutions with an alkaline reaction. Such alkaline solutions are useful for sizing or coating paper or textiles where their alkaline nature is not a hindrance, but their general utility in the arts is seriously limited by their alkaline nature.

It is, accordingly, an object of the present invention to provide a method whereby neutral or slightly acid aqueous solutions of polyvalent metal salts of cellulose glycollic acid may be prepared.

According to the present invention, the foregoing and related objects may be attained by first dissolving a polyvalent metal salt of cellulose glycollic acid in an aqueous alkaline solution, such as one of sodium hydroxide, ammonia, or methyl amine, to form a clear alkaline solution, and then cautiously and with stirring adding an acid to the solution only until the base is neutralized, and the desired pH, not to exceed 7, is attained. In contrast with the results obtained when the polyvalent metal salts of cellulose glycollic acid are treated directly with an acid and in which the salts are dissociated to form cellulose glycollic acid and a salt of the treating agent, the present invention provides a method of obtaining a neutral or acid solution of the polyvalent metal salt, substantially without dissociation of the salt.

The present method is applicable for making neutral or acid solutions of any of the polyvalent metal salts of cellulose glycollic acid which remain undissolved when simply suspended in water. Among such salts there may be named those of aluminum, zinc, titanium, tin, iron, chromium, copper, nickel, cobalt, zirconium, and the like. Many of these salts, because of the color of the ions are of less utility than those whose metallic ions are substantially colorless. The method, therefore, will probably find its greatest utility in connection with the preparation of solutions of aluminum, zinc, and titanium salts, though the tin salt is also of considerable value.

It might be remarked that cellulose glycollic acid may be produced in several degrees of substitution. All forms of cellulose glycollic acid yield sodium salts. In certain degrees of substitution the sodium cellulose glycollate is water-soluble while other of the glycollic acid ethers of cellulose only yield sodium salts which are soluble in alkali but not in water. The salts with which the present invention is concerned are polyvalent metal salts which may be obtained from the water-soluble sodium cellulose glycollate by a simple base exchange reaction. For example, the aluminum salt here concerned may be prepared by treating an aqueous solution of sodium cellulose glycollate with alum and filtering off the supernatant liquor from the so-formed precipitate.

The initial solution of the polyvalent metal salt in the alkaline medium requires only a small amount of alkali and it is desirable to minimize the amount of alkali employed to keep down the concentration of inorganic salt formed during the subsequent neutralization of the alkaline solution. Thus, the polyvalent metal salts of cellulose glycollic acid may be dissolved in ammonia solutions containing as little as 0.25 per cent ammonium hydroxide or in sodium hydroxide solutions containing 0.2 per cent, or even less, of the stated alkali.

Among the acids which may be used to neutralize or to acidify the primary alkaline solution of the polyvalent metal salts are hydrochloric acid, sulfuric acid, nitric acid or such organic acids as acetic, formic, or lactic acids. The acid agent is usually employed in dilute aqueous solution for ease of control during the neutralization reaction.

The neutral or acid solutions obtained according to the herein described method are clear and free from visible gels. The viscosity of these acid or neutral solutions of a polyvalent metal cellulose glycollate is of the same order of magnitude as that of a solution of sodium cellulose glycollate of equal concentration made from the same cellulose glycollic acid.

The following example is illustrative of the invention. A solution of aluminum cellulose glycollate was prepared by dissolving two parts by weight of dry aluminum cellulose glycollate in 100 parts by weight of 0.4 per cent ammonium hydroxide. The resulting solution had a pH of 9.2. Dilute hydrochloric acid was added cautiously and with stirring to the ammoniacal solution until a pH of 6.0 was obtained, and the resulting clear colorless solution was divided into two portions. One portion was further acidified to a pH of 2 without causing separation of solid from the solution. The other portion was dialyzed to give an ammonium chloride- and aluminum chloride-free, stable solution of aluminum cellulose glycollate which could be further acidified to give a salt-free acid solution of aluminum cellulose glycollate. The dialyzed solution was treated with ethyl alcohol, to precipitate the solute. This was thoroughly washed with water, dried, and analyzed for combined aluminum. The solute was shown by analysis to be neutral aluminum cellulose glycollate.

By similar treatment, numerous other of the polyvalent metal salts of cellulose glycollic acid were found to yield comparable solutions of those salts. The neutral or acid polyvalent metal salt solutions of the present invention may be employed as sizes, coatings, protective colloids, and the like. On evaporation of the aqueous medium the present clear solutions yield substantially water-insoluble deposits.

We claim:

1. A method of preparing an aqueous solution of a water-insoluble polyvalent metal salt of a cellulose glycollic acid whose sodium salt is water-soluble, which comprises dissolving such a polyvalent metal salt of cellulose glycollic acid in an aqueous alkaline medium and cautiously adding acid, while agitating the solution, at least until the pH of the solution has been reduced to 7.

2. A method of preparing an aqueous solution of a water-insoluble aluminum salt of a cellulose glycollic acid whose sodium salt is water-soluble, which comprises dissolving such an aluminum cellulose glycollate in an alkaline aqueous medium and cautiously adding acid, with agitation, at least until the pH has been reduced to 7.

3. A method of preparing an aqueous solution of a water-insoluble tin salt of a cellulose glycollic acid whose sodium salt is water-soluble, which comprises dissolving such a tin cellulose glycollate in an alkaline aqueous medium and cautiously adding acid, with agitation, at least until the pH has been reduced as low as 7.

4. A method of preparing an aqueous solution of a water-insoluble polyvalent metal salt of a cellulose glycollic acid whose sodium salt is water-soluble, which comprises dissolving such a polyvalent metal salt of cellulose glycollic acid in an aqueous alkaline medium and cautiously adding acid, while agitating the solution, until the pH is reduced at least to 7, and dialyzing the so-formed solution to free it substantially from purely inorganic salts.

5. A method of preparing an aqueous solution of a water-insoluble aluminum salt of a cellulose glycollic acid whose sodium salt is water-soluble, which comprises dissolving such an aluminum cellulose glycollate in an alkaline aqueous medium and cautiously adding acid, with agitation, at least until the pH has been reduced as low as 7, and dialyzing the so-formed solution to free it substantially from purely inorganic salts.

6. A method of preparing an aqueous solution of a water-insoluble tin salt of a cellulose glycollic acid whose sodium salt is water-soluble, which comprises dissolving such a tin cellulose glycollate in an alkaline aqueous medium and cautiously adding acid, with agitation, at least until the pH has been reduced as low as 7, and dialyzing the so-formed solution to free it substantially from purely inorganic salts.

7. A method as claimed in claim 1, wherein the alkaline aqueous medium employed is dilute ammonium hydroxide.

8. A method of preparing an aqueous solution of a water-insoluble polyvalent metal salt of a cellulose glycollic acid whose sodium salt is water-soluble, which comprises dissolving such a polyvalent metal salt of cellulose glycollic acid in an aqueous alkaline medium and adding acid, at least until the pH of the solution has been reduced to 7.

RICHARD D. FREEMAN.
MARTIN J. ROBERTS.